(12) United States Patent
Jiang et al.

(10) Patent No.: US 11,645,066 B2
(45) Date of Patent: May 9, 2023

(54) MANAGING AND DISTRIBUTING PATCHES FOR MULTI-TENANT APPLICATIONS

(71) Applicant: International Business Machines Corporation, Armonk, NY (US)

(72) Inventors: Peng Hui Jiang, Beijing (CN); Jun Su, Beijing (CN); Hong Qing Zhou, Shanghai (CN); Zhang Li, Beijing (CN); Yan Lin Ren, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 121 days.

(21) Appl. No.: 17/408,564

(22) Filed: Aug. 23, 2021

(65) Prior Publication Data

US 2023/0058477 A1 Feb. 23, 2023

(51) Int. Cl.
*G06F 8/65* (2018.01)
*G06F 11/36* (2006.01)

(52) U.S. Cl.
CPC ............ *G06F 8/65* (2013.01); *G06F 11/3688* (2013.01); *G06F 11/3692* (2013.01)

(58) Field of Classification Search
USPC ........................................................ 717/168
See application file for complete search history.

(56) References Cited

U.S. PATENT DOCUMENTS

| | | | | |
|---|---|---|---|---|
| 11,074,062 B1* | 7/2021 | Hosic | ......................... | G06F 8/65 |
| 2016/0085543 A1 | 3/2016 | Islam et al. | | |
| 2017/0371641 A1 | 12/2017 | Spieler et al. | | |
| 2019/0130010 A1 | 5/2019 | Ayer et al. | | |
| 2019/0155597 A1 | 5/2019 | Lander et al. | | |
| 2020/0073655 A1* | 3/2020 | Park | .......................... | G06F 8/65 |
| 2020/0073956 A1* | 3/2020 | Chen | ..................... | G06F 16/128 |
| 2020/0264860 A1 | 8/2020 | Srinivasan et al. | | |
| 2022/0121558 A1* | 4/2022 | Bryan | ........................ | G06F 8/60 |
| 2022/0222066 A1* | 7/2022 | Franzen | .................. | H04L 67/34 |

OTHER PUBLICATIONS

Bhargav Bachina; "Kubernetes—Learn Sidecar Container Pattern"; Medium.com website [full url in ref.]; Sep. 7, 2020 (Year: 2020).*

(Continued)

*Primary Examiner* — Qing Chen
*Assistant Examiner* — Clint Thatcher
(74) *Attorney, Agent, or Firm* — Cantor Colburn LLP; Teddi Maranzano (57) ABSTRACT

Aspects include applying a patch to a first instance of software code and verifying that the first instance of the software code with the patch applied is operating as expected. The verifying includes sending a request to the first instance of the software code and sending the request to a second instance of the software code where the patch was previously applied. The verifying also includes comparing a first result received from the first instance of the software code in response to the request and a second result received from the second instance of the software code in response to the request. The verifying further includes determining that the first instance of the software code with the patch applied is operating as expected based on the first result being within a similarity threshold of the second result.

20 Claims, 8 Drawing Sheets

(56) References Cited

OTHER PUBLICATIONS

Scott McCarty; "Understanding Root Inside and Outside a Container"; RetHat.com website [full url in ref.]; Dec. 2, 2019 (Year: 2019).*
Oracle Financial Serviices,"Multi-Tenant Patch-set Deployment", Publication Date: Jan. 2019, 17 pages.
Peter Mell et al., "The NIST Definition of Cloud Computing", NIST, Special Publication 800-145, Sep. 2011, 7 pages.

* cited by examiner

402 {
```
POST /api/2.2/sites/9a8b7c6d-5e4f-3a2b-1c0d-9e8f7a6b5c4d/users HTTP/1.1
HOST: my-server
X-Tableau-Auth: 12ab34cd56ef78ab90cd12ef34ab56cd
Content-Type: text/xml
<tsRequest>
<user name="NewUser" siteRole="Publisher" />
</tsRequest>
```

404 {
```
POST /api/2.2/sites/9a8b7c6d-5e4f-3a2b-1c0d-9e8f7a6b5c4d/users HTTP/1.1
HOST: my-server
X-Tableau-Auth: 12ab34cd56ef78ab90cd12ef34ab56cd
Content-Type: application/json
{ "user": { "name": "NewUser1", "siteRole": "Publisher" } }
```

406 {
```
POST /api/2.2/sites/9a8b7c6d-5e4f-3a2b-1c0d-9e8f7a6b5c4d/users HTTP/1.1
HOST: my-server
X-Tableau-Auth: 12ab34cd56ef78ab90cd12ef34ab56cd
Content-Type: application/json
{ "user": { "name": "NewUser1", "siteRole": "Publisher" } }
```

MANAGING AND DISTRIBUTING PATCHES FOR MULTI-TENANT APPLICATIONS

BACKGROUND

The present invention relates generally to computer processing, and more specifically, to managing and distributing patches for multi-tenant applications.

A patch is a set of changes to a computer program or its supporting data designed to update, fix, or improve the computer program. This includes fixing security vulnerabilities and other bugs, with such patches usually being called bugfixes or bug fixes. Patches are often written to improve the functionality, usability, and/or performance of a computer program.

Patches may be installed either under program control or by a human programmer using an editing tool or a debugger. They may be applied to program files on a storage device or in computer memory. Patches may be permanent (until patched again) or temporary. Patching makes possible the modification of compiled and machine language object programs when the source code is unavailable. Even when the source code is available, patching can make it possible to install small changes to the object program without the need to recompile or reassemble. For minor changes to software, it is often easier and more economical to apply patches rather than redistributing a newly recompiled or reassembled software program.

SUMMARY

Embodiments of the present invention are directed to managing and distributing patches for multi-tenant applications. A non-limiting example computer-implemented method includes applying a patch to a first instance of software code and verifying that the first instance of the software code with the patch applied is operating as expected. The verifying includes sending a request to the first instance of the software code and sending the request to a second instance of the software code where the patch was previously applied. The verifying also includes comparing a first result received from the first instance of the software code in response to the request and a second result received from the second instance of the software code in response to the request. The verifying further includes determining that the first instance of the software code with the patch applied is operating as expected based on the first result being within a similarity threshold of the second result.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describe having a communications path between two elements and do not imply a direct connection between the elements with no intervening elements/connections between them. All of these variations are considered a part of the specification.

DETAILED DESCRIPTION

One or more embodiments of the present invention are directed to managing and distributing software patches for multi-tenant applications. Patches are widely used to address issues in computer systems that are currently being used by customers (e.g., live systems). The live environments that are executing instances of an application to be patched can be quite diverse and complex. In accordance with one or more embodiments of the present invention, the live environment can include live pods having live containers that are executing software programs in response to customer requests. In addition, in cloud environments different tenants, or customers, are sharing the live systems that are being updated with software patches.

Although contemporary continuous integration and continuous deployment (CI/CD) methods provide different patch deployment strategies, including for example, blue-green deployment, A/B testing, canary methods, and rolling deployments, there are still issues related to multi-tenant configurations and persistency of data to a database or other storage location. After data is written to persistency, rollback is no longer possible if it is determined that an upgrade, or patch, didn't work as expected. Issues with contemporary approaches are also related to verifying the correctness of a patch and improving confidence in the results of the patching process.

In accordance with one or more embodiments of the present invention, software patches are managed and distributed through the use of sidecars, or other code components, that control traffic and manage data during the patch upgrade process. In accordance with one or more embodiments of the present invention, patches are applied to software executing in containers using a patch scheduler that verifies, or tests, the patches in response to requests to access the software that is in the process of being upgraded. Requests from tenants having access to a container being upgraded (e.g., with a new patch) are directed to a sidecar container that accesses a shadow database engine to write an operational log to cache. The requests are also duplicated and sent to a container that was previously successfully upgraded, and operational logs that represent, or include details describing, the duplicated requests and responses are directed by the sidecar to a database engine that writes the operation log to persistent storage.

The requests and responses from the original request and the duplicated request are compared to check the difference after the request is processed by the previously updated container and the container currently being upgraded. The container currently being upgraded is changed to status of upgraded (from upgrading or upgrade in process) once defined criteria about the comparison is met. This process of applying and testing the patch is performed for all of the instances, or containers, of the software until all of the software has been upgraded and all of the tenants are accessing upgraded software.

As used herein, the terms "multi-tenant" or "multi-tenancy" refers to a computing environment where a single instance of software and its supporting infrastructure serves multiple customers. A multi-tenant software architecture, or software multi-tenancy, refers to a single instance of a software application (and its underlying database and hardware) that serves multiple tenants, or user accounts. A tenant can be an individual user or a group of users (e.g., a customer organization) that shares common access to and privileges within the application instance. Each tenant's data is isolated from, and invisible to, the other tenants sharing the application instance, ensuring data security and privacy for all tenants. The multi-tenant software provider is typically responsible for updates and patches, and thus new features are added and/or fixes applied without any effort on the customer's part.

As used herein, the term "container" refers to a package that includes a program that is executing software code (e.g., an application or service), and all of its dependencies, such as code, runtime, system libraries, etc. As used herein, the terms "sidecar", or "sidecar container" refer to a container that extends or enhances the functionality of another, or main, container. Tenants may request services provided by one or more containers.

One or more embodiments of the present invention can be implemented on an orchestration platform such as, but not limited to Kubernetes, OpenShift, Docker Swarm, and Cloudify. The Kubernetes platform has a construct referred to as a "pod" which is a logical wrapper entity for a container to execute in a Kubernetes cluster. A pod is the smallest deployable unit in Kubernetes, and it includes a group of one or more containers with shared storage/network resources and a specification for how to run the containers. Though some examples described herein use Kubernetes as the orchestration platform, embodiments are not limited to Kubernetes as they may be implemented in conjunction with any suitable orchestration platform known in the art.

As mentioned previously, one contemporary method of applying patches to a live system is referred to as blue and green deployment. The approach uses two identical environments front-ended by a router or load balancer, that directs traffic to the appropriate environment. An advantage of this approach is that the switch is almost instantaneous which results in very little, and in some cases almost zero, downtime. Disadvantages of this approach are that current transactions and sessions are lost due to the physical switch from one machine serving the traffic to another machine serving the traffic. It also suffers from "N-1" data compatibility issues, because at any point in time more than one version of the application is being executed. In addition, data reflecting output from the patch being tested may be written to persistent storage before the patch has been fully tested and verified.

One or more embodiments of the present invention address one or more of the shortcomings of contemporary approaches for applying patches in multi-tenant applications by applying the patch to particular application instances and using a shadow database engine to write operational logs containing results of a request to a non-persistent storage location (e.g., cache). In one or more embodiments, in parallel with the request being processed by an upgrading application the request is also being processed by an upgraded application that was previously updated with the new patch. Operational logs including results from the upgraded application are written using a database engine to a persistent storage location. In this manner, data generated during the testing of the upgrading application instance is not written to persistent storage (e.g., cache storage), and this eliminates the data consistency issues of contemporary methods. In addition, one or more embodiments of the present invention do not require different versions of the database or additional database code to perform the management and distribution of the patches, as the only difference between the database engine and the shadow database engine is the storage location of the outputs.

One or more embodiments of the present invention avoid the sharp switching of contemporary methods and instead provide software patch deployment that includes multiple software versions running at the same time. Thus, there are no current transactions or sessions that are lost due to a physical switch from one machine running the software to another. In addition, one or more embodiments of the present invention do not suffer from N-1 data compatibility issues of contemporary approaches because different traffic can go to applications with different patch levels.

One or more embodiments of the present invention can be utilized to provide stability and to verify the correctness of patches in a multi-tenant environment. In addition, by using a patch scheduler as described herein, one or more embodiments of the present invention can accelerate the deployment of patches and verification of patches for production, or live, systems. One or more embodiments are non-invasive (e.g., they do not require changes) to the database engine. In addition, one or more embodiments of the present invention provide a rolling update of application instances as well as a rollback mechanism when a patch does not meet the defined verification criteria.

Figure 1:
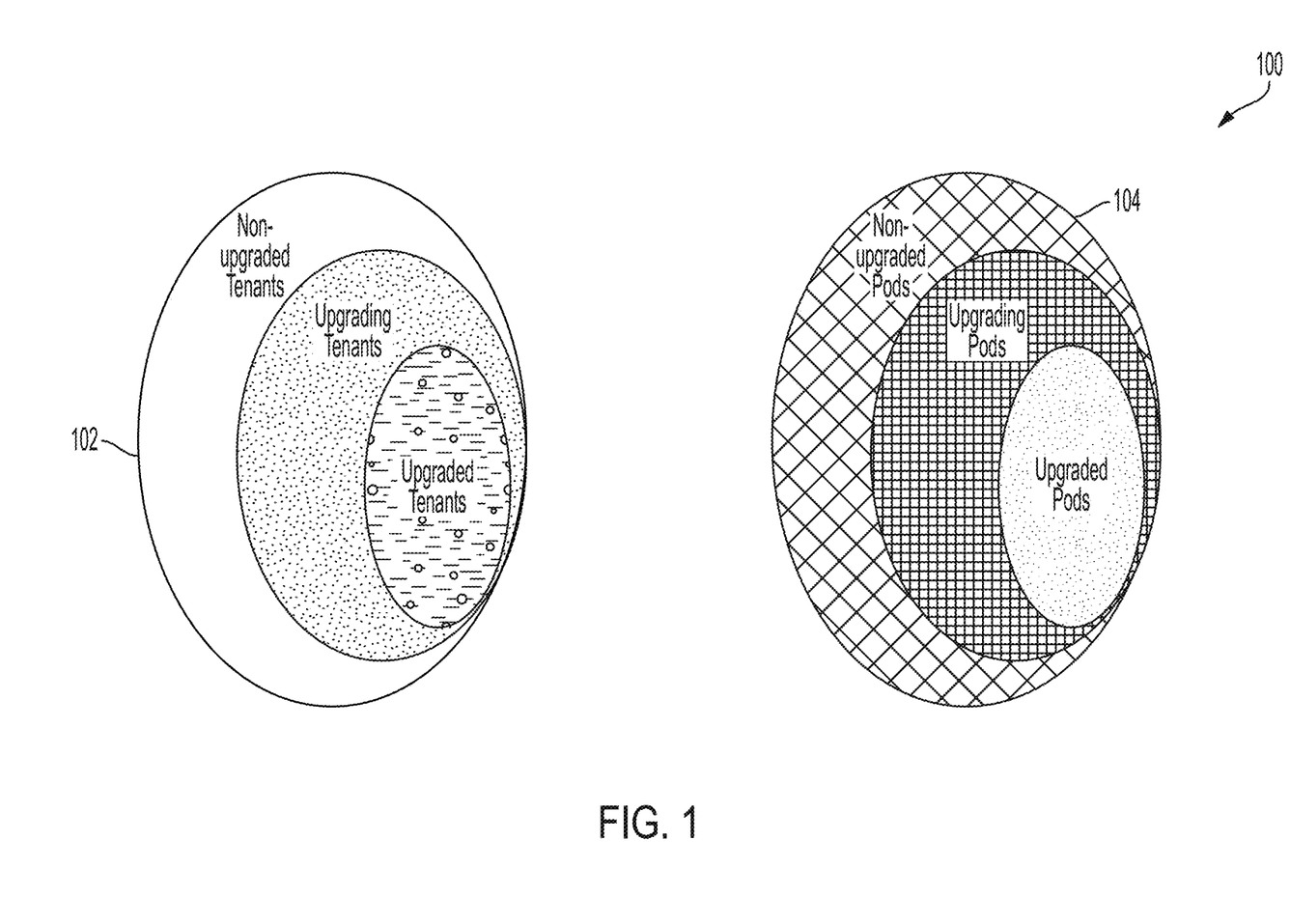
FIG. 1 depicts an illustration of tenants and pods at various patch levels according to one or more embodiments of the present invention.

Turning now to FIG. 1, an illustration 100 of tenants 102 and pods 104 at various patch levels is generally shown in accordance with one or more embodiments of the present invention. As shown in FIG. 1, tenants 102 can be non-upgraded tenants that utilize application code prior to a patch being applied, upgrading tenants that utilize application code while the patch is being applied and verified, and upgraded tenants that utilize application code where the patch has been successfully applied. At any point in time the tenants 102 will fall into one of these categories with respect to a specified patch or set of patches. In accordance with one or more embodiments, the goal is to move all of the tenants 102 into the upgraded tenants category which means that all of the tenants 102 access software code that has been upgraded with the patch.

Also as shown in FIG. 1, pods 104 can be non-upgraded pods that execute application code that has not had the patch applied, upgrading pods that execute application code that is the process of having a patch applied and verified, and upgraded pods that execute application code where the patch has been successfully applied. At any point in time the pods 104 will fall into one of these categories with respect to a specified patch or patches. In accordance with one or more embodiments, the goal is to move all of the pods 104 into the upgraded pods category which means that all of the pods 104 contain software code that has been upgraded with the patch.

Figure 2:
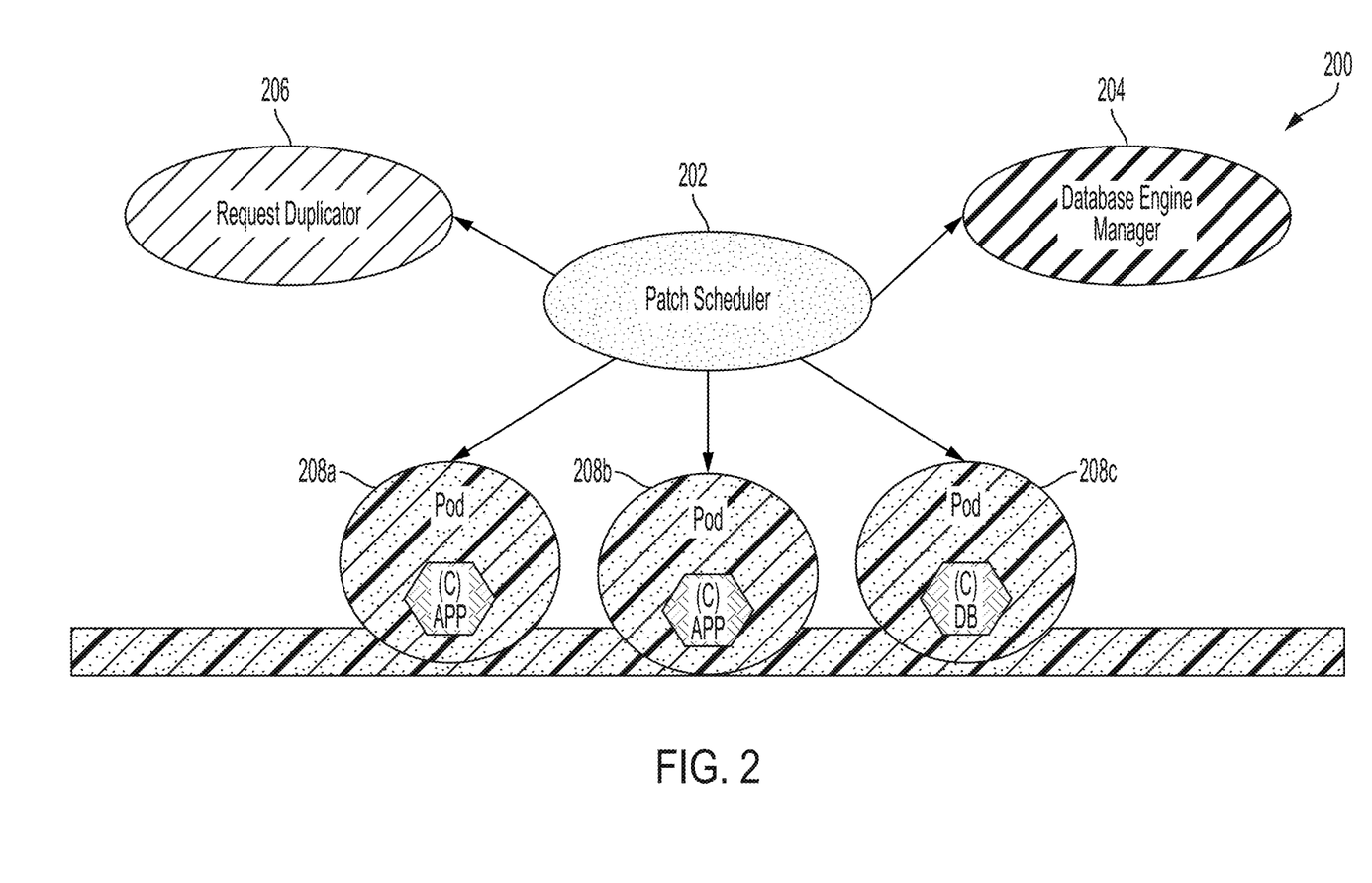
FIG. 2 depicts an illustration of a patch scheduler for managing and distributing patches for multi-tenant applications according to one or more embodiments of the present invention.

Turning now to FIG. 2, an illustration 200 of a patch scheduler container 202 for managing and distributing patches for multi-tenant applications is generally shown in accordance with one or more embodiments of the present invention. All or a portion of the processing described in reference to the block diagram of FIG. 2 can be performed, for example, by computer system 800 of FIG. 8 and/or by one or more of the cloud computing nodes 10 and/or cloud computing devices 54A-N of FIG. 6.

The patch scheduler container 202 shown in FIG. 2 is in communication with a request duplicator container 206, a database engine manager container 204, and a plurality of pods 208a 208b 208c (referred to herein collectively as pods 208). The pods 208 shown in FIG. 2 include two pods 208a 208b with containers containing an application and one pod 208c with a container that contains a database. It should be appreciated that embodiments are not limited to three pods 208 as any number of pods 208 having any number of different types of containers may be in communication with the patch scheduler 202. In addition, each pod 208 may have one or more containers.

In accordance with one or more embodiments of the present invention, the patch scheduler container 202 schedules one or more patches to be applied in a gradual manner (e.g., to a subset of containers and/or pods) according to a patch deployment plan and/or a health statistic until all the containers have been updated with the patch. Examples of health statistics include, but are not limited to, statistics related to computer resource usage and/or response times.

In accordance with one or more embodiments of the present invention, the patch scheduler container 202 schedules a patch by instructing the request duplicator container 206 to duplicate traffic for tenants accessing containers that are about to be upgraded (referred to herein as "upgrading" containers or pods) and by notifying the database engine manager container 204 to schedule a database engine container and a shadow database engine container.

In response to receiving the instruction from the patch scheduler container 202, the request duplicator container 206 generates duplicate traffic by sending any requests directed to the upgrading container(s) to a container(s) (executing another instance of the application being patched) that has already been successfully upgraded. After the request(s) is processed, the results of the two can be compared and results of the request to the container being upgraded can be verified against defined criteria to determine whether the application instance is performing as expected after the patch has been applied.

In response to receiving the notification from the patch scheduler container 202, the database engine manager container 204 generates a database engine container and a shadow database engine container. The requests received from the container(s) being upgraded are routed to the shadow database engine container which writes to a cache storage and a recycled storage, and the requests received from the previously upgraded container are routed to the database engine container which writes to a persistent storage and to the cache storage. The use of the two database engine containers allows transaction logs for the upgrading application container to be written to a different (non-persistent) storage location than transaction logs for the upgraded application container.

Figure 3:
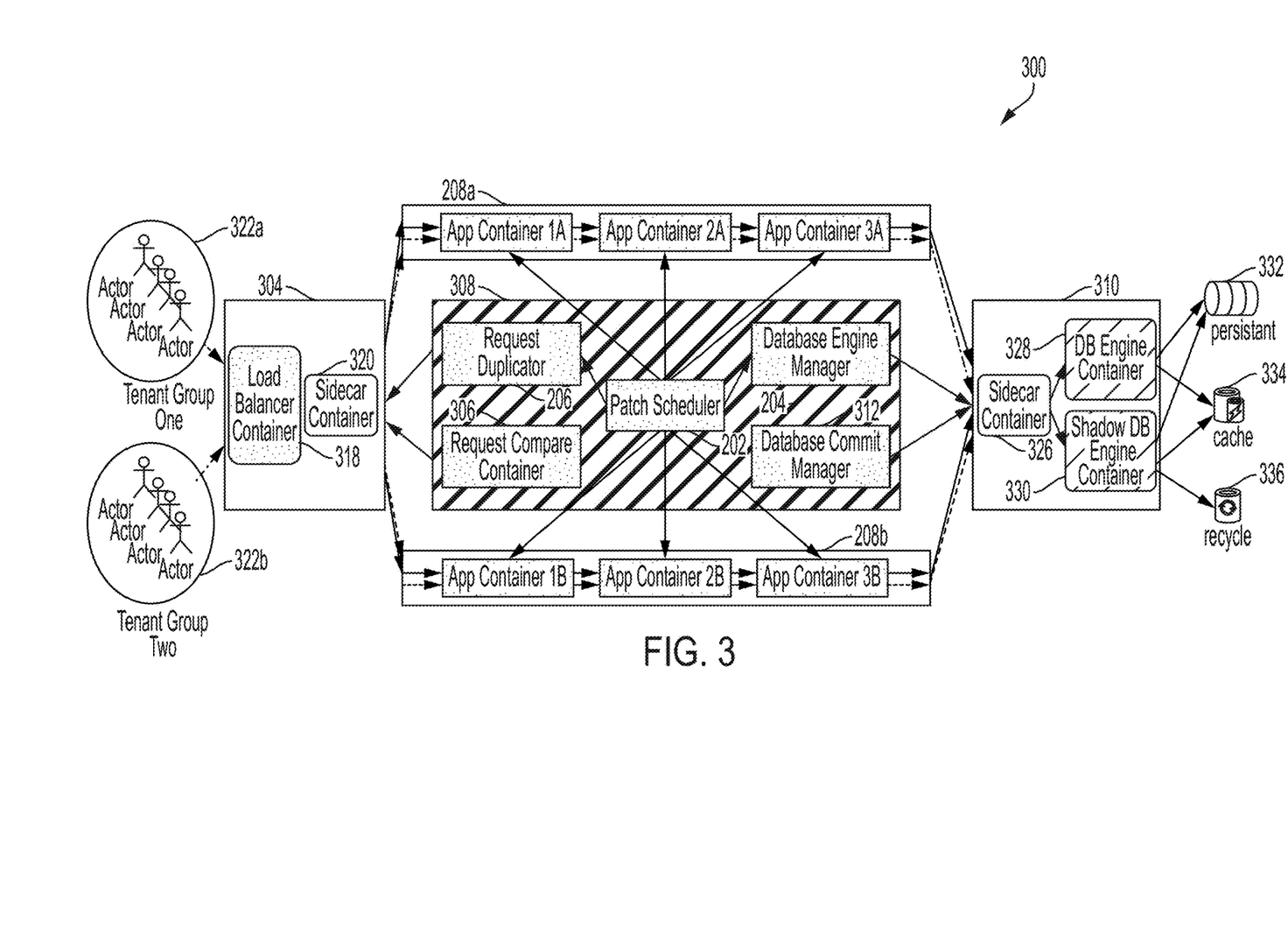
FIG. 3 depicts a block diagram of a system for managing and distributing patches for multi-tenant applications according to one or more embodiments of the present invention.

Turning now to FIG. 3, a block diagram 300 of a system for managing and distributing patches for multi-tenant applications is generally shown in accordance with one or more embodiments of the present invention. The block diagram 300 shown in FIG. 3 includes tenant groups 322a 322b (referred to herein collectively as tenant groups 322), load balancing pod 304, application pods 208a 208b (referred to herein collectively as application pods 208), management pod 308, database engine pod 310, persistent storage 332, cache storage 334, and recycle storage 336. The solid lines in FIG. 3 indicate traffic related to a request received from a tenant in the tenant groups 322 and the dashed lines (between load balancing pod 304, application pods 208, management pod 308, and database engine pod 310) indicate duplicate traffic initiated by the patch scheduler 202. All or a portion of the processing described in reference to the block diagram of FIG. 3 can be performed, for example, by computer system 800 of FIG. 8 and/or by one or more of the cloud computing nodes 10 and/or cloud computing devices 54A-N of FIG. 6. The persistent storage 332, cache storage 334, and recycle storage 336 can be located in any one or more storage mediums known in the art and can be accessed locally and/or via one or more networks. In one or more embodiments of the present invention, one or more of the persistent storage 332, cache storage 334, and recycle storage 336 are located on computer system 800 of FIG. 8 and/or on one or more of the cloud computing nodes 10 and/or computing devices 54A-N of FIG. 6.

As shown in FIG. 3, the management pod 308 includes the request duplicator container 206, a request compare container 306, the patch scheduler container 202, the database engine manager container 204, and database commit manager container 312. The management pod 308 includes containers that are used to manage and distribute patches to one or more of the applications in the application pods 208. As described previously, the patch scheduler container 202 schedules a patch by instructing the request duplicator container 206 to duplicate traffic for tenants accessing containers that are about to be upgraded ("upgrading" containers) and by instructing the database engine manager container 204 to schedule a database engine container 330 and a shadow database engine container 328. In response to the instruction, the request duplicator container 206 instructs sidecar container 320 that is executing in the load balancing pod 304 to duplicate traffic from any tenants in the tenant groups 322 that are requesting access to applications that are in the process of being patched, or that have an upgrade in process. The sidecar container 320 causes the load balancing pod 304 to send requests from these tenants in the tenant groups 322 to both the container of the application in the process of being upgraded with a patch (the upgrading container) and to a container of an application that has already been upgraded with the patch (an upgraded container).

In response to receiving the instruction from the patch scheduler container 202, the database engine manager container 204 instantiates database engine container 328 and shadow database engine container 330. In accordance with one or more embodiments of the present invention, the shadow database engine container 330 is a duplicate of and behaves the same as the database engine container 328 except for the writing of the operational log into the cache storage 334. Sidecar container 326 in the database engine pod 310 determines whether any traffic being received at the database engine pod 310 is from a tenant that is accessing an application container that is in the upgrade process of applying a new patch, and upon detecting such traffic the sidecar container 326 directs the traffic to the shadow database engine container 330. As shown in FIG. 3, the shadow database engine container 330 writes an operational log for the request and a response to the request into the cache storage 334 (and not to the persistent storage 332). The duplicate traffic routes the request to an application container that was previously upgraded with the patch and sidecar container 326 routes the writing of the operational log to the database engine container 328 which can access both the cache storage 334 and the persistent storage 332 to keep data consistency.

Once a request to the application being upgraded with a patch and the duplicate request to an application previously upgraded with the patch have been completed and they have both generated responses, the request compare container 306 evaluates the response from the application container currently being upgraded with the patch. In accordance with one or more embodiment of the present invention, the request compare container 306 not only compares the request, but also compares the responses to the requests. The comparison can be performed according to defined rules. For example, responses can be compared and be determined to be the same, nearly the same, different, etc. Particular fields, such as timestamp fields may not be required to the same but may be required to be within a particular amount of time of each other to reach a determination that the software code with the patch is operating in an expected manner. Other fields may be required to be exactly the same in order to teach a conclusion that the software with the patch is operating in an expected manner. In accordance with one or more embodiments, the operational logs record requests and responses. See FIG. 4 for examples 400 of operational log contents.

In accordance with one or more embodiments of the present invention, in order to reduce throttling of request comparisons in different requests, there is one ratio that is used to indicate whether the comparison results in a conclusion that the request and response are the same or not. This similarity ratio, or score, can be calculated as: score=S1·w1+S1·w1+ . . . SN·wN; where S represents a level of similarity related to a data pair, w represents a weight assigned to the data pair, and N represents the number of similarities related to a data pair. Data pairs can include, but are not limited to status line, headers, body, tenant information, and noise information (e.g., timestamp, separators, etc.). Results can be determined to be within a similarity threshold of each other based on the score. For example, a score over a particular threshold value (e.g., 75%, 80%, 90%, 99%) may be used to indicate that the requests and/or results are similar. When the comparing is completed, the data written by the shadow database engine container 330 to the non-persistent cache storage 334 and the non-persistent recycle storage 336 is no longer required and can be deleted.

The processing described in reference to FIG. 3 is not intended to indicate that the operations are to be executed in any particular order, or that all of the operations shown in FIG. 3 are to be included in every case. Additionally, the processing shown in FIG. 3 can include any suitable number of additional modules for performing additional operations. Further, the modules shown in FIG. 3 can be arranged differently, and the pods and/or container can be arranged differently than shown in FIG. 3.

Figure 4:
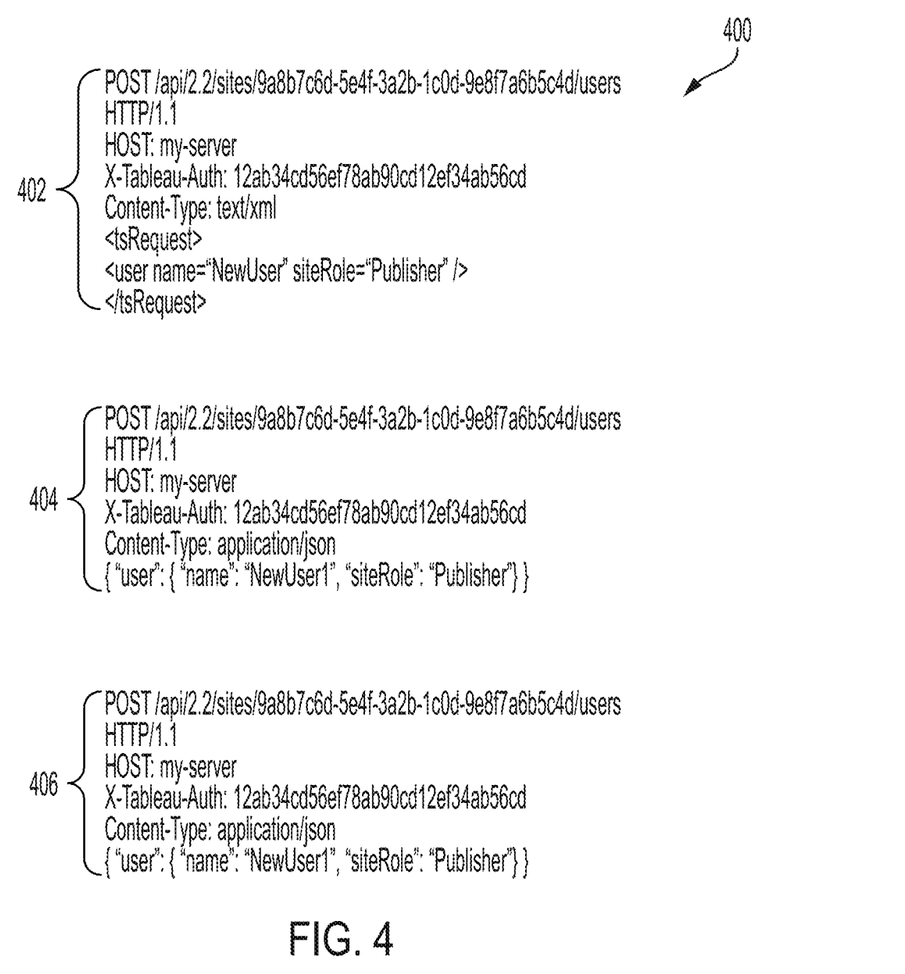
FIG. 4 depicts example operational log contents according to one or more embodiments of the present invention.

Turning now to FIG. 4, examples 400 of operational log contents are generally shown in accordance with one or more embodiments of the present invention. The examples 400 shown in FIG. 4 include log contents for a request 402, and log contents for two responses 404 406.

Figure 5:
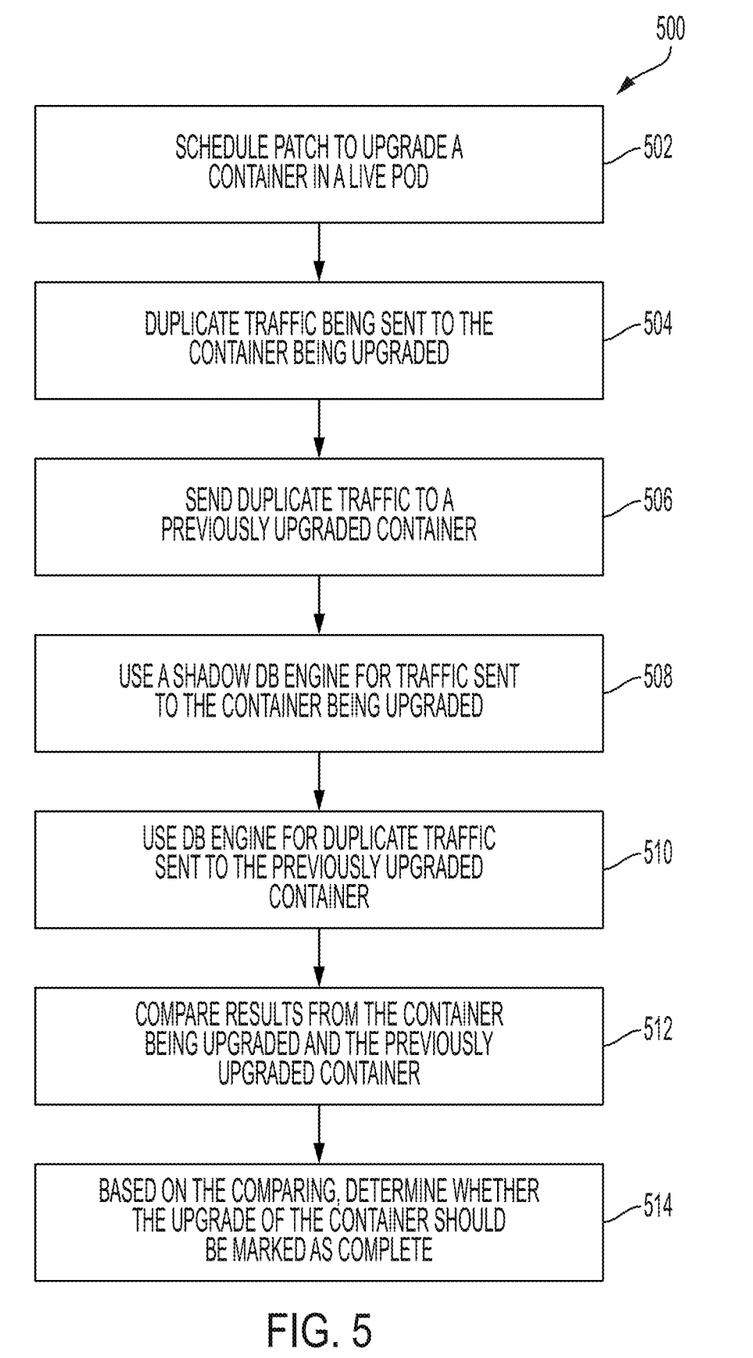
FIG. 5 depicts a flow diagram of a method for managing and distributing patches for multi-tenant applications according to one or more embodiments of the present invention.

Turning now to FIG. 5, a flow diagram of a method 500 for managing and distributing patches for multi-tenant applications is generally shown in accordance with one or more embodiments of the present invention. All or a portion of the processing described in reference to the block diagram of FIG. 5 can be performed, for example, by computer system 800 of FIG. 8 and/or by one or more of the cloud computing nodes 10 and/or cloud computing devices 54A-N of FIG. 6.

At block 502, a patch to a container in a live (currently executing) pod is scheduled, for example, by patch scheduler 202 of FIG. 2. The patch is applied to software code in the container (referred to as the "upgrading container"). At block 504, the traffic being sent to the upgrading is duplicated, for example by request duplicator container 206 of FIG. 2. At block 506, the duplicate traffic is sent to an upgraded container, which is a container that includes an instance of the software code that the patch was previously applied to (and the correctness of the patch was verified). At block 508, a shadow database, such as shadow database engine container 330 of FIG. 3, is used to write an operational log to cache storage, such as cache storage 334 of FIG. 3, for the traffic directed to the upgrading container. At block 510, a database, such as database engine container 328 of FIG. 3, is used to write an operational log to persistent storage, such as persistent storage 332 of FIG. 3, for the traffic directed to the upgraded container.

At block 512, the operational logs from the cache storage and the persistent storage are compared. At block 514 it is determined, based on results of the comparing, whether the container being upgraded with the patch should be moved into an upgraded status. The comparing includes comparing a result received from an instance of the software executing in the upgrading container to a result received from an instance of the software executing in the upgraded container. It is determined that the upgrading container is operating as expected with the patch when the results are within a similarity threshold of each other. In accordance with one or more embodiments of the present invention, the similarity score (S) described previously is calculated at block 512 and a similarity score over a selected threshold value indicates at block 514 that the upgrading container is operating as expected because the results are within a similarity threshold of each other.

The processing of blocks 504 through 512 can be performed multiple times before it is determined at block 514 that the status of the upgrading container should be changed to upgraded. The patch can be backed out if it is determined that the upgrading container is not operating as expected.

The process flow diagram of FIG. 5 is not intended to indicate that the operations are to be executed in any particular order, or that all of the operations shown in FIG. 54 are to be included in every case. Additionally, the processing shown in FIG. 5 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
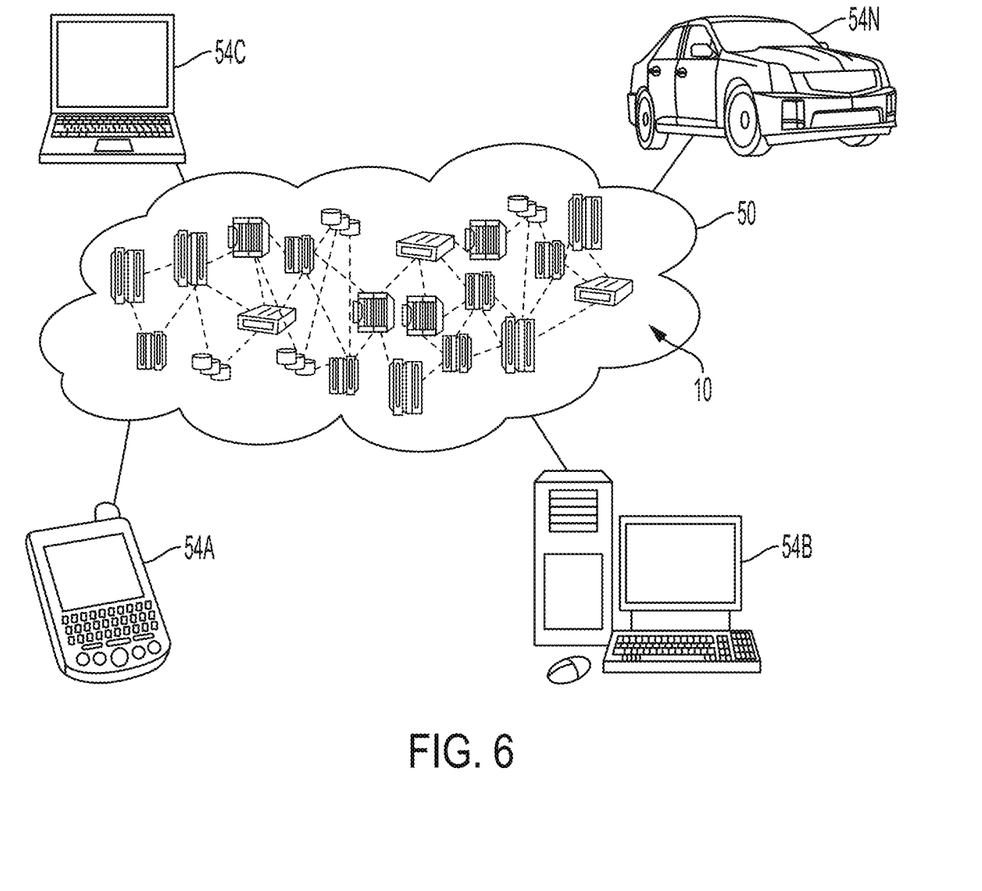
FIG. 6 depicts a cloud computing environment according to one or more embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
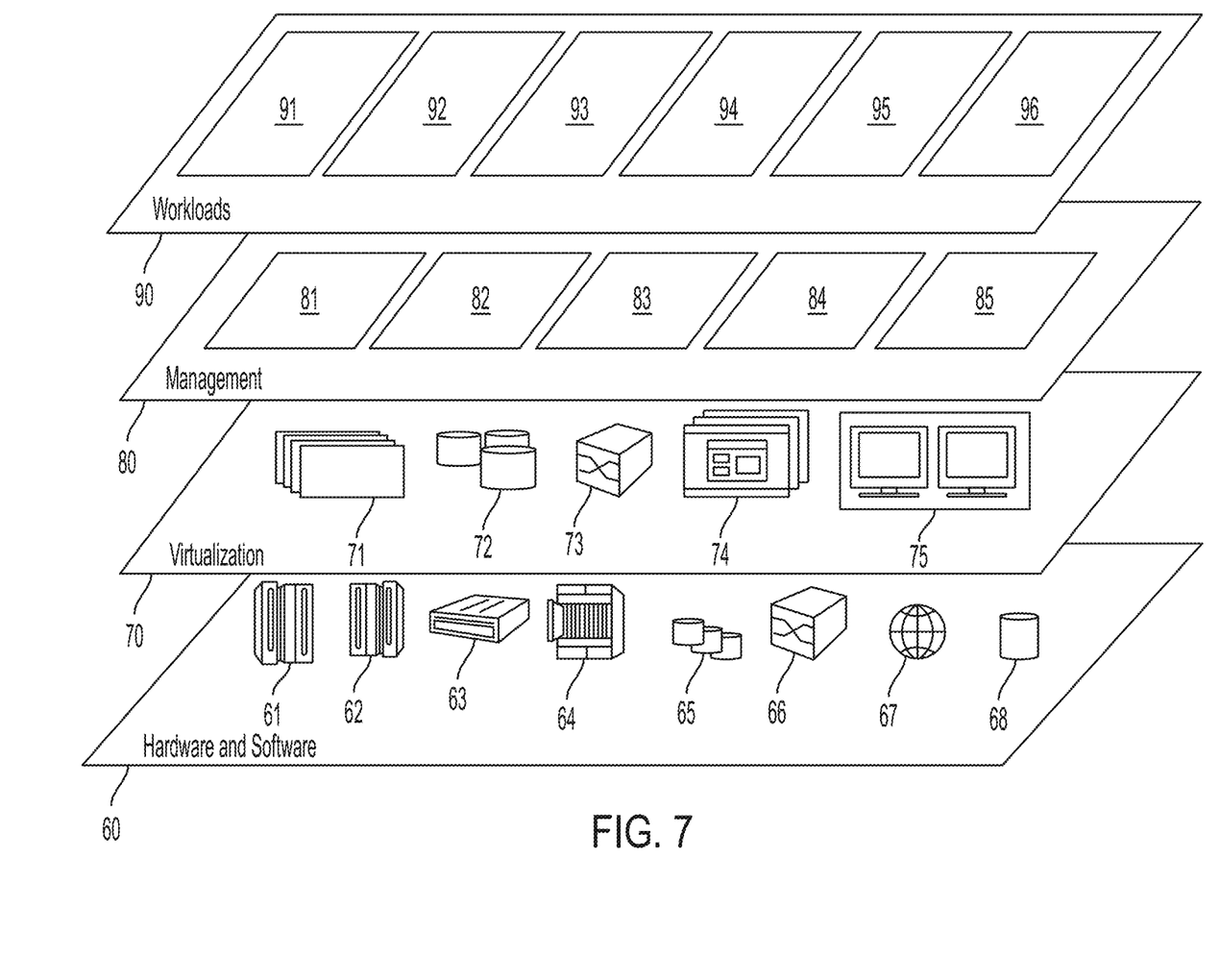
FIG. 7 depicts abstraction model layers according to one or more embodiments of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data encryption/decryption 96.

It is understood that one or more embodiments of the present invention are capable of being implemented in conjunction with any type of computing environment now known or later developed.

Figure 8:
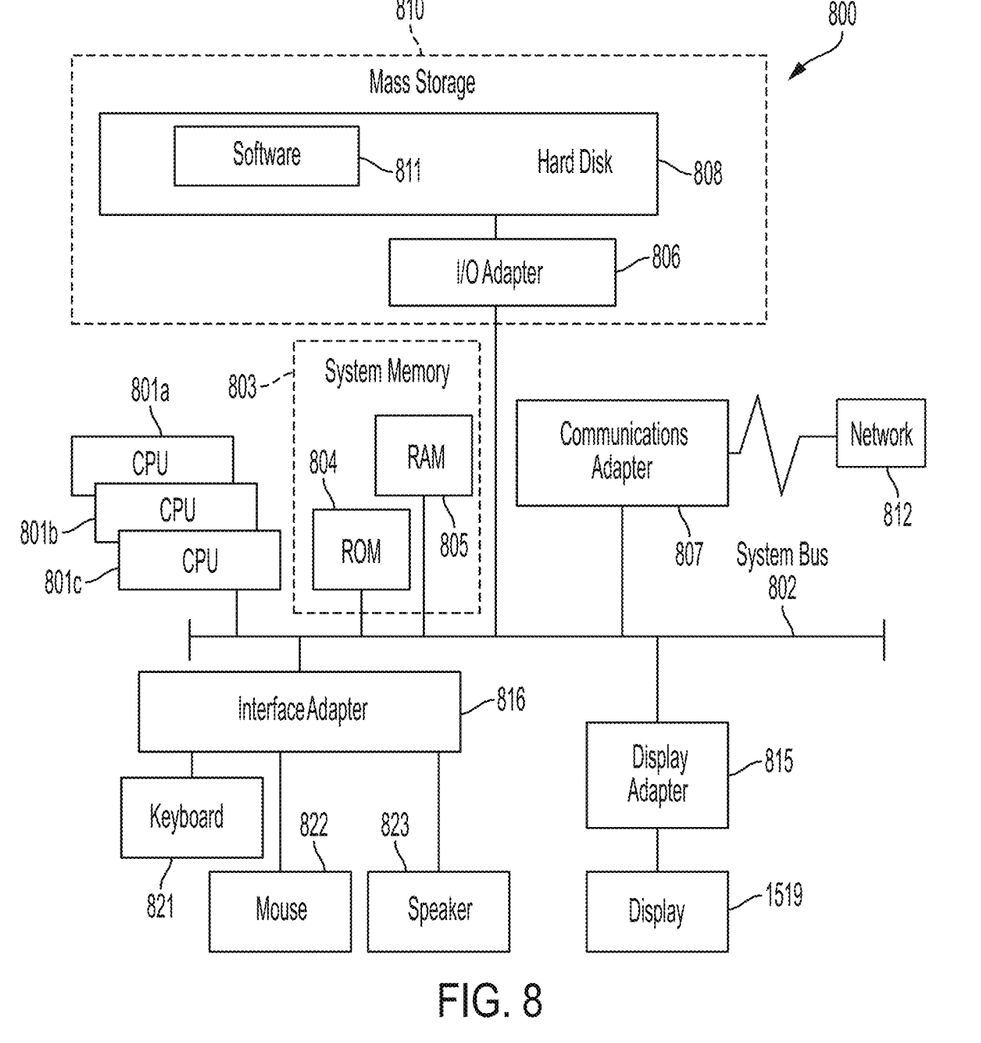
FIG. 8 illustrates a system for dynamic code snippet promotion according to one or more embodiments of the present invention.

Turning now to FIG. 8, a computer system 800 is generally shown in accordance with an embodiment. All or a portion of the computer system 800 shown in FIG. 8 can be implemented by one or more cloud computing nodes 10 and/or computing devices 54A-N of FIG. 6. The computer system 800 can be an electronic, computer framework comprising and/or employing any number and combination of computing devices and networks utilizing various communication technologies, as described herein. The computer system 800 can be easily scalable, extensible, and modular, with the ability to change to different services or reconfigure some features independently of others. The computer system 800 may be, for example, a server, desktop computer, laptop computer, tablet computer, or smartphone. In some examples, computer system 800 may be a cloud computing node. Computer system 800 may be described in the general context of computer system executable instructions, such as program modules, being executed by a computer system. Generally, program modules may include routines, programs, objects, components, logic, data structures, and so on that perform particular tasks or implement particular abstract data types. Computer system 800 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system 800 has one or more central processing units (CPU(s)) 801a, 801b, 801c, etc. (collectively or generically referred to as processor(s) 801). The processors 801 can be a single-core processor, multi-core processor, computing cluster, or any number of other configurations. The processors 801, also referred to as processing circuits, are coupled via a system bus 802 to a system memory 803 and various other components. The system memory 803 can include a read only memory (ROM) 804 and a random access memory (RAM) 805. The ROM 804 is coupled to the system bus 802 and may include a basic input/output system (BIOS), which controls certain basic functions of the computer system 800. The RAM is read-write memory coupled to the system bus 802 for use by the processors 801. The system memory 803 provides temporary memory space for operations of said instructions during operation. The system memory 803 can include random access memory (RAM), read only memory, flash memory, or any other suitable memory systems.

The computer system 800 comprises an input/output (I/O) adapter 806 and a communications adapter 807 coupled to the system bus 802. The I/O adapter 806 may be a serial advanced technology attachment (SATA) adapter that communicates with a hard disk 808 and/or any other similar component. The I/O adapter 806 and the hard disk 808 are collectively referred to herein as a mass storage 810.

Software 811 for execution on the computer system 800 may be stored in the mass storage 810. The mass storage 810 is an example of a tangible storage medium readable by the processors 801, where the software 811 is stored as instructions for execution by the processors 801 to cause the computer system 800 to operate, such as is described herein with respect to the various Figures. Examples of computer program product and the execution of such instruction is discussed herein in more detail. The communications adapter 807 interconnects the system bus 802 with a network 812, which may be an outside network, enabling the computer system 800 to communicate with other such systems. In one embodiment, a portion of the system memory 803 and the mass storage 810 collectively store an operating system, which may be any appropriate operating system, such as the z/OS® or AIX® operating system, to coordinate the functions of the various components shown in FIG. 8.

Additional input/output devices are shown as connected to the system bus 802 via a display adapter 815 and an interface adapter 816 and. In one embodiment, the adapters 806, 807, 815, and 816 may be connected to one or more I/O buses that are connected to the system bus 802 via an intermediate bus bridge (not shown). A display 819 (e.g., a screen or a display monitor) is connected to the system bus 802 by a display adapter 815, which may include a graphics controller to improve the performance of graphics intensive applications and a video controller. A keyboard 821, a mouse 822, a speaker 823, etc. can be interconnected to the system bus 802 via the interface adapter 816, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 8, the computer system 800 includes processing capability in the form of the processors 801, and storage capability including the system memory 803 and the mass storage 810, input means such as the keyboard 821 and the mouse 822, and output capability including the speaker 823 and the display 819.

In some embodiments, the communications adapter 807 can transmit data using any suitable interface or protocol, such as the internet small computer system interface, among others. The network 812 may be a cellular network, a radio network, a wide area network (WAN), a local area network (LAN), or the Internet, among others. An external computing device may connect to the computer system 800 through the network 812. In some examples, an external computing device may be an external webserver or a cloud computing node.

It is to be understood that the block diagram of FIG. 8 is not intended to indicate that the computer system 800 is to include all of the components shown in FIG. 8. Rather, the computer system 800 can include any appropriate fewer or additional components not illustrated in FIG. 8 (e.g., additional memory components, embedded controllers, modules, additional network interfaces, etc.). Further, the embodiments described herein with respect to computer system 800 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/ connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk drive (HDD), a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
applying a patch to a first instance of software code; and
verifying that the first instance of the software code with the patch applied is operating as expected, the verifying comprising:
sending a request to the first instance of the software code and sending the request to a second instance of the software code, wherein the patch was previously applied to the second instance of the software code;
comparing a first result received from the first instance of the software code in response to the request and a second result received from the second instance of the software code in response to the request; and
determining that the first instance of the software code with the patch applied is operating as expected based on the first result being within a similarity threshold of the second result.

2. The computer-implemented method of claim 1, wherein a first operational log including the first result is written to cache storage and a second operational log including the second result is written to persistent storage.

3. The computer-implemented method of claim 1, wherein the first instance of the software code and the second instance of the software code are included in a group of instances of the software code, and the patch is applied to the instances of the software code in the group in an order that is determined based least in part on a patch deployment plan.

4. The computer-implemented method of claim 1, wherein the first instance of the software code is executing in a first container and the second instance of the software code is executing in a second container.

5. The computer-implemented method of claim 1, wherein any one or more of multiple tenants are configured to send the request to the first instance of the software code.

6. The computer-implemented method of claim 1, further comprising determining that the first instance of the software code with the patch applied is not operating as expected based on the first result not being within the similarity threshold of the second result.

7. The computer-implemented method of claim 6, further comprising backing out the patch from the first instance of the software code in response to determining that the first instance of the software code with the patch applied is not operating as expected.

8. The computer-implemented method of claim 1, wherein the similarity threshold is generated based at least in part on defined rules that include levels of similarity.

9. The computer-implemented method of claim 1, wherein the similarity threshold is based at least in part on a similarity ratio.

10. A system comprising:
one or more processors for executing computer-readable instructions, the computer-readable instructions controlling the one or more processors to perform operations comprising:
applying a patch to a first instance of software code; and
verifying that the first instance of the software code with the patch applied is operating as expected, the verifying comprising:
sending a request to the first instance of the software code and sending the request to a second instance of the software code, wherein the patch was previously applied to the second instance of the software code;
comparing a first result received from the first instance of the software code in response to the request and a second result received from the second instance of the software code in response to the request; and
determining that the first instance of the software code with the patch applied is operating as expected based on the first result being within a similarity threshold of the second result.

11. The system of claim 10, wherein a first operational log including the first result is written to cache storage and a second operational log including the second result is written to persistent storage.

12. The system of claim 10, wherein the first instance of the software code and the second instance of the software code are included in a group of instances of the software code, and the patch is applied to the instances of the software code in the group in an order that is determined based least in part on a patch deployment plan.

13. The system of claim 10, wherein the first instance of the software code is executing in a first container and the second instance of the software code is executing in a second container.

14. The system of claim 10, wherein any one or more of multiple tenants are configured to send the request to the first instance of the software code.

15. The system of claim 10, wherein the operations further comprise determining that the first instance of the software code with the patch applied is not operating as expected based on the first result not being within the similarity threshold of the second result.

16. The system of claim 15, wherein the operations further comprise backing out the patch from the first instance of the software code in response to determining that the first instance of the software code with the patch applied is not operating as expected.

17. The system of claim 10, wherein the similarity threshold is generated based at least in part on defined rules that include levels of similarity.

18. The system of claim 10, wherein the similarity threshold is based at least in part on a similarity ratio.

19. A computer program product comprising a computer-readable storage medium having program instructions embodied therewith, the program instructions executable by one or more processors to cause the one or more processors to perform operations comprising:
applying a patch to a first instance of software code; and
verifying that the first instance of the software code with the patch applied is operating as expected, the verifying comprising:
sending a request to the first instance of the software code and sending the request to a second instance of the software code, wherein the patch was previously applied to the second instance of the software code;
comparing a first result received from the first instance of the software code in response to the request and a second result received from the second instance of the software code in response to the request; and
determining that the first instance of the software code with the patch applied is operating as expected based on the first result being within a similarity threshold of the second result.

20. The computer program product of claim 19, wherein a first operational log including the first result is written to cache storage and a second operational log including the second result is written to persistent storage.

* * * * *